United States Patent [19]

Ehrhard

[11] 3,941,855

[45] Mar. 2, 1976

[54] SHAPED POLYURETHANE ARTICLES AND A METHOD FOR MAKING THEM

[75] Inventor: Fritz Ehrhard, Neuss, Germany

[73] Assignee: Bayer Aktiengesellschaft, Leverkusen, Germany

[22] Filed: July 22, 1974

[21] Appl. No.: 490,649

[30] Foreign Application Priority Data
July 27, 1973 Germany............................ 2338185

[52] U.S. Cl. ... 260/77.5 AP; 260/37 N; 260/75 NP; 260/77.5 AM; 260/77.5 AB; 260/77.5 AC
[51] Int. Cl.²........................................ C08G 18/32
[58] Field of Search. 260/77.5 AP, 77.5 AT, 75 NP, 260/77.5 AM

[56] References Cited
UNITED STATES PATENTS

| | | | |
|---|---|---|---|
| 3,061,559 | 10/1962 | Henson et al. | 260/77.5 AP |
| 3,352,830 | 11/1967 | Schmitt et al. | 260/77.5 AP |
| 3,420,796 | 1/1969 | Matsubayashi et al. | 260/77.5 AP |

Primary Examiner—M. J. Welsh
Attorney, Agent, or Firm—Joseph C. Gil; Gene Harsh

[57] ABSTRACT

A shaped polyurethane product having improved arc-resistance, current leakage properties and dimensional stability which adapt it to be used as an electrical insulator is made by shaping a reactive mixture containing a. a polyisocyanate having only cycloaliphatic isocyanato groups,
b. a polyisocyanate having only cycloaliphatic and aliphatic isocyanato groups, or
c. a mixture of (a) or (b) with an aliphatic polyisocyanate, with a polyol mixture containing
d. 5 to 30 percent by weight, based on the total weight of the polyol mixture of a polyol or polyol mixture having a molecular weight below about 1000 in which the hydroxyl groups are only cycloaliphatically or aliphatically bound and at least 50% thereof are cycloaliphatically bound; and
e. 70 to 90 percent by weight of a polyol or polyol mixture having a molecular weight below 1000 in which the hydroxyl groups are substantially all aliphatically bound.

7 Claims, No Drawings

SHAPED POLYURETHANE ARTICLES AND A METHOD FOR MAKING THEM

This invention relates to a method for making electrical insulators and more particularly to a method of molding electrical insulator products which have improved arc resistance, tracking resistance and dimensional stability.

It is known that articles which have been insulated against electricity with an epoxy resin can be improved in their resistance to the open air by coating them with polyurethane lacquers which are free from aromatic groups. These coatings improve the resistance of the articles to the constituents in the air by rendering the articles more hydrophobic.

It is also known that electrical insulators can be rendered surface leakage resistant by coating them with a thin external layer of aliphatic polyurethane compounds which are free from aromatic or cycloaliphatic groups (German Offenlegungsschrift No. 1,769,113).

When attempts are made to manufacture solid insulators from these coating materials, it is found that the mechanical strength of these insulators, particularly the Martens degree (DIN 53462), is not sufficient, so that in practice these substances can only be used as coatings.

It is therefore an object of this invention to provide a method for making polyurethane electrical insulators. Another object of the invention is to provide a molded polyurethane electrical insulator. Still another object of the invention is to provide a method for making molded polyurethane electrical insulators which are adapted to be used in the open air or in the manufacture of electrical switches.

The foregoing objects and others are accomplished in accordance with this invention, generally speaking, by providing a method for making molded or similarly shaped electrical insulators wherein an organic polyisocyanate having only cycloaliphatically bound isocyanato groups or only cycloaliphatically and aliphatically bound isocyanato groups or a mixture of organic polyisocyanates in which at least sone of the isocyanato groups are cycloaliphatically bound and the other isocyanato groups are all aliphatically bound is reacted with a mixture of from about 5 percent to about 30 percent by weight, based on the total weight of polyol mixture, of a polyol or polyols which have a molecular weight below about 1000 and having from 50 to 100 percent of its hydroxyl groups cycloaliphatically bound with the remaining hydroxyl groups being aliphatically bound and from about 70 to 95 percent by weight of polyol or polyols having a molecular weight below about 1000 and containing only aliphatically bound hydroxyl groups.

In contrast to the results observed in German Offenlegungsschrift No. 1,769,113, it has now surprisingly been found that polyurethanes which are composed at least partly of cycloaliphatic units are excellent for the manufacture of electrical insulators used in the open air and for the manufacture of electric switch plants if the starting materials used for manufacturing them are selected according to the conditions described below.

This invention provides a process for manufacturing molded polyurethane products which are arc-resistant, leakageproof and suitable for use in the open air for open air insulations and electric switch plants by reacting organic polyisocyanates containing isocyanate groups of which at least some are bound cycloaliphatically with polyol mixtures, optionally in the presence of the usual additives used in polyurethane chemistry and resin casting technology, the reactants being used in proportions by weight such that the NCO/OH ratio is between 0.8 and 1.2 characterized in that the polyol mixture is one which has an average hydroxy functionality of 2.2 to 3.0 and which comprises (1) 5 to 30 percent by weight, based on the total polyol mixture, of polyols which have a molecular weight below 1000 and in which 50 to 100 percent of the hydroxyl groups are cycloaliphatically bound and the remainder are only aliphatically bound and (2) 70 to 95 percent by weight of polyols with a molecular weight below 1000 which contain only aliphatically bound hydroxyl groups.

The manufacture of the molded products by the process according to the invention is preferably carried out by the one pot or single stage process by mixing the reactants and then cold setting or heat setting and, at the same time, shaping the mixture by casting, spraying or laminating techniques which are known per se. If desired, however, the process according to the invention may also be carried out by the prepolymer method in which the isocyanate component is first reacted with a part of the polyol components to form an isocyanate prepolymer which is then mixed with the remaining polyol components and with the auxiliary substances and additives, after which the desired molded product is preferably produced in a molding process.

In the process according to the invention, the organic isocyanate component and polyol components are used in proportions corresponding to an NCO/OH ratio of 0.8 to 1.2, preferably 0.95 – 1.05.

The polyisocyanate component used in the process according to the invention contains at least 25% and preferably at least 50% of cycloaliphatically bound isocyanate groups in addition to aliphatically bound isocyanate groups. The polyisocyanate component may comprise either a single organic polyisocyanate or a mixture of several organic polyisocyanates. Suitable cycloaliphatic polyisocyanates are in particular those of the general formula

in which n n 2 or 3 and R represents a cycloaliphatic hydrocarbon group containing from 5 to 15 carbon atoms. Aliphatic polyisocyanates of the above mentioned general formula in which n has the meaning specified above and R represents an aliphatic hydrocarbon group which contains from 4 – 18 carbon atoms and which may be interruped, in particular by urethane or biuret groups, may also be used in the process according to the invention in combination with the aforesaid cycloaliphatic polyisocyanates.

Any suitable cycloaliphatic diisocyanate may be used such as, for example, 3-isocyanatomethyl-3,5,5-trimethyl-cyclohexylisocyanate, 4,4'-diisocyanatodicyclohexylmethane, 4,4'-diisocyanatodicyclohexylpropane-(2,2), 2,4-diisocyanato-1-methyl-cyclohexane, 2,6-diisocyanato-1-methyl-cyclohexane and the like.

Any suitable aliphatic polyisocyanate may be used in combination with the cycloaliphatic polyisocyanate such as, for example, tetramethylene diisocyanate, hexamethylene diisocyanate, octamethylenediisocyanate, trimethylhexamethylenediisocyanate, tris-(isocyanatohexyl)-biuret and the like and polyisocyanates which contain urethane groups such as the reaction product of 3 mols of hexamethylene diisocyanate and 1 mol of trimethylol propane and the like.

The polyol component used for the process according to the invention is a polyol mixture with an average hydroxyl functionality of 2.2 to 3.0, preferably 2.6 to 2.98.

It is a mixture of
1. cycloalkane polyols, i.e. polyalcohols which contain cycloaliphatically bound hydroxyl groups, and
2. alkane polyols, i.e. polyalcohols which contain aliphatically bound hydroxyl groups.

The polyol components (1) and (2) are used in proportions by weight of between 1 : 2 and 1 : 30, preferably between 1 : 3 and 1 : 25.

Particularly suitable cycloaliphatic polyols (1) are those within a molecular weight range of 116 to 1000, preferably 116 to 300, e.g. the various isomeric cyclohexane diols and triols, 4,4'-dihydroxy-dicyclohexylmethane, 4,4'-dihydroxydicyclohexylpropane-(2,2) and the like.

The polyol components (2) are either alkane polyols with molecular weights of from 62 to 1000, mixtures of such alkanepolyols and polyether polyols of the kind known per se in polyurethane chemistry and/or ester group-containing polyols which have aliphatically bound hydroxyl groups. If desired, the reaction mixture used for the process according to the invention may also include aliphatic polyol mixtures which contain from 0 to 80 parts by weight of a polyether polyol with a molecular weight below 1000 and/or 0 to 25 parts by weight of an ester group-containing polyol with a molecular weight below 1000, per 100 parts by weight of alkanepolyol.

Examples of polyols and polyisocyanates of the kind described herein as suitable for practicing the invention are disclosed in the book "Polyurethanes: Chemistry and Technology", by Saunders and Frisch published by Interscience Publishers, 1962. Divalent, trivalent and tetravalent aliphatic alcohols are particularly suitable alkane polyols for the process according to the invention, e.g. ethylene glycol, propane-1,2-diol, butane-1,2-diol, butane-1,3-diol, hexamethyleneglycol, glycerol, trimethylolpropane, pentaerythritol and the like.

Any suitable polyether polyol may be used in practicing the process of the invention and particular, the addition products of ethylene oxide and/or propylene oxide with low molecular weight polyols of the kind mentioned above by way of example, but the quantity of alkylene oxide grafted on the polyols must be calculated so that the upper limits for molecular weight specified above are not exceeded.

Polyols which contain ester groups and which are suitable for the process according to the invention include the ester-group containing reactants commonly used for polyisocyanates in polyurethane chemistry, e.g. the polyester polyols which can be obtained from the low molecular weight polyols given as examples above and less than equivalent quantities of dicarboxylic acids such as adipic acid or phthalic acid, or also glycerides which contain hydroxyl groups, e.g. castor oil, or the products obtained by boiling fats and oils which are free from hydroxyl groups with polyols such as trimethylol propane or glycerol.

In principle, small quantities of higher molecular weight polyols with a molecular weight of from 1000 to 4000, i.e. approximately 1 to 10% by weight, based on the polyol component, may be included in the process according to the invention without significantly impairing the advantageous properties of the products of the process.

In addition to the reactants mentioned above, the usual auxiliary agents and additives used in polyurethane chemistry and of casting technology may also be included in the process according to the invention including those described in the Saunders and Frisch book. The following are examples:

1. Water adsorbents, such as alkali metal aluminosilicate with a zeolite structure If the reaction mixture cannot be degasified and dehydrated by vacuum treatment alone, zeolite must be added to the reaction mixture to insure that the cast products will be obtained free from bubbles.

2. Catalysts

The reaction between the resin and the hardener may be started and/or accelerated by catalysts. The following are suitable: Tertiary amines such as triethylamine and triethylenediamine and organometallic compounds, such as zinc octoate and dibutyl tin dilaurate.

Mixtures of the tertiary amine and organometallic catalysts are particularly suitable.

3. Fillers which improve the properties, such as:

quartz sand, chalk, aluminum hydroxide and woven structures, fibers, shavings of glass or textile.

4. Flame retarders and plasticizers and other additives conventionally used in the resin casting technology.

Production of the insulating materials according to the invention may be carried out by the usual methods employed for casting resins.

In the simplest case, the isocyanate component is heated to a temperature of from 20° to 130°C, the polyol mixture is added with stirring and the resulting mixture is poured into a mold made of synthetic resin or a metal which has previously been treated with mold release agent. The mixture sets in the mold at a temperature of from 23° to 30°C after the addition of a catalyst (cold setting), at 30° to 80°C (warm setting) or 80° to 180°C (heat setting) within a period varying from a few minutes to several hours. After removal of the molded products from the molds, tempering in a heating cupboard or oven at 140° to 180°C invariably improves the properties of the product.

The additives such as water adsorbents, fillers, plasticizers, dyes, pigments, flame retarders, mold release agents, etc. may be added in the dried or evacuated state at any time before hardening if necessary.

A special advantage of the process according to the invention lies in the fact that it makes it possible to produce molded products with a very high filler content (70% to 80% by weight of inert fillers based on the total substance) which have excellent mechanical properties and, in particular, a Martens degree above 115° C (DIN 53462) and excellent arc resistance and tracking resistance.

Among the various electrical testing methods, the following two laboratory processes which have been described in detail in standard specifications are carried out:

1. Determination of the arc resistance according to ASTM D 495-61.
2. Determination of the permanent resistance to tracking at high voltage according to ASTM D 2303 (see test method for determining tracking resistance and erosion of insulating material with a contaminated liquid on an inclined plane). This is a method of investigating the tracking resistance at high voltage and under unfavorable environmental conditions (ETZ-B 22 (1970) 579-580). In addition to these laboratory methods, the insulators were tested under conditions resembling service conditions to determine their long term resistance to mechanical, electric and climatic stresses as an indication of their service life.

Leaving aside climatic influences (especially water in its various forms such as rain, fog, ice or dew), arc resistant and tracking resistant insulating materials, especially those which have a Martens temperature of 115° to 145°C, are also suitable for use on switchgear, especially in $SF_6$-insulated plant.

The following examples show that the molded products obtained by the process according to the invention are distinctly superior both to molded products based on aromatic and/or aliphatic polyisocyanates and to those based on cycloaliphatic polyisocyanates in combination with exclusively aliphatic polyols. The combination of very good electrical properties with excellent mechanical properties which can be achieved by the process according to the invention has previously been unattainable in the field of electric insulating materials based on polyurethanes.

EXAMPLE 1 (Comparison)

Sample A: 136 g of a polyether polyol (propylene oxide grafted on trimethylolpropane; hydroxyl group content 12%), 14 g of zeolite paste (prepared from sodium aluminum silicate and castor oil in proportions of 1 : 1) and 280 g of quartz sand are stirred together in a vacuum (1 Torr) at 100°C and degasified in a vacuum until free from bubbles. 100 g of 3,3,5-trimethyl-5-isocyanatomethyl-cyclohexylisocyanate, used as the isocyanate component, are degasified in a vacuum with 300 g of quartz sand at 100°C. When both reactants have been cooled to 60°C, the mixture is homogenized in a vacuum. The reaction mixture is then poured into aluminum molds heated to 120°C, and left to set in the mold for 24 hours.

| Flexural strength | DIN 53 452 | 1320 kp/cm² |
|---|---|---|
| Impact strength | DIN 53 453 | 8–12 kp cm/cm² |
| Marten's degree | DIN 53 462 | 56°C |
| Arc resistance | ASTM D 495-61 | 215 seconds |
| Tracking endurance | ASTM D 2303 | 6 kV - 360 min |

Sample B: A reaction mixture of the following composition is prepared according to the process described for Sample A:
116 g of the polyetherpolyol used in Example 1, Sample A,
100 g of 4,4'-diisocyanatodicyclohexylmethane,
12 g of zeolite paste,
530 g of quartz sand,
and the mixture is poured, when at a temperature of 80°C, into aluminum molds heated to 130°C. The mixture is set for 24 hours at 130°C. The following properties are determined for the molded product:

| Flexural strength | DIN 53 452 | 1200 kp/cm² |
|---|---|---|
| Impact strength | DIN 53 453 | 16 kp cm/cm² |
| Marten's degree | DIN 53 462 | 51°C |
| Arc resistance | ASTM D 495-61 | 209 seconds |
| Tracking endurance | ASTM D 2303 | 6 kV - 264 min |

Sample C: 100 g of the polyetherpolyol used in Sample A, 10 g of zeolite paste, a triturated mixture of 5 g of sodium aluminum silicate and 5 g of castor oil and 210 g of predried quartz sand are stirred together under a vacuum (1 Torr) at 100°C until free from bubbles. When the mixture has cooled to room temperature, 100 g of 4,4'-diphenylmethane diisocyanate are added and the reaction mixture is poured into aluminum plate molds. Setting conditions: 23°C/24 hours. The following properties were determined on the molded material:

| Flexural strength | DIN 53 452 | 1020 kp/cm² |
|---|---|---|
| Impact strength | DIN 53 453 | 13 kp cm/cm² |
| Marten's degree | DIN 53 462 | 70°C |
| Arc resistance | ASTM D 495-61 | 144 seconds |
| Tracking endurance | ASTM D 2303 | 4.75 kV - 20 min |

Sample D: 74 g of the polyetherpolyol used in Sample A are worked up with 6 g of zeolite paste (sodium aluminosilicate and castor oil 1 : 1) and 180 g of predried quartz sand in a vacuum of 1 Torr at 100°C. When the resulting mixture has cooled to 70°C, 100 g of tris-(isocyanatohexyl) biurets are added and the reaction mixture is set in aluminum molds at 70°C for 24 hours. Properties of molded material determined:

| Flexural strength | DIN 53 452 | 235 kp/cm² |
|---|---|---|
| Impact strength | DIN 53 453 | 48 kp cm/cm² |
| Marten's degree | DIN 53 462 | 29°C |
| Arc resistance | ASTM D 495-61 | 182 seconds |
| Tracking endurance | ASTM D 2303 | 4.75 kV - 60 min |

The comparison tests carried out as described above show that test samples produced by methods of the known art are satisfactory in their electric properties provided that they are free from aromatic groups as in the case of Samples A, B and D but are unsatisfactory in their dimensional stability under heat. Sample C is unsatisfactory both in its electrical and its mechanical properties.

EXAMPLE 2

To work up the isocyanate component, 470 g of 3,3,5-trimethyl-5-isocyanatomethyl-cyclohexylisocyanate and 1440 g of quartz sand are degasified in a vacuum of less than 1 mm Hg at 100°C with stirring until no more bubbles rise from the surface of the liquid.

To prepare the polyol component with an average functionality of 2.70 and a molar ratio of cycloaliphatic to aliphatic polyols of 1 : 2.4, 30 g of the polyether polyol used in Example 1, Sample A, are first triturated with 30 g of zeolite powder (sodium aluminosilicate) in a rolling mill. The resulting paste is added to a melt heated to 100°C consisting of 135 g of trimethylolpropane, 45 g of cyclohexane-1,2-diol and 15 g of 2,2-bis-(4-hydroxy-cyclohexyl)-propane and the mixture is stirred in a vacuum at 100°C and degasified until no more bubbles rise. Mixing of resin and hardener is carried out at 85°C under normal pressure. The reaction mixture can be cast as soon as it is homogeneous.

The major portion of it is used to manufacture a drip edge supporting insulator for 24 kV (casting weight 1.8 kg). The steel mold for the support is preheated to 120°C, filled with the reaction mixture and left in the oven for 16 hours for the reaction mixture to set. The experimental insulator can be used in the open air without showing any traces of tracking on the surface.

The smaller portion of the reaction mixture is poured into an aliminum plate mold heated to 120°C to form a plate. Setting conditions: 140°C/16 hours. The following properties were determined on test samples cut out of this plate:

| | | |
|---|---|---|
| Flexural strength | DIN 53 452 | 1400–1500 kg/cm² |
| Impact strength | DIN 53 454 | 6–8 kp/cm² |
| Marten's degree | DIN 53 462 | 140°C |
| Arc resistance | ASTM D 495 | 200 seconds |
| Tracking endurance | ASTM D 2303 | 6 kV - 480 min |

EXAMPLE 3

The isocyanate resin component consisting of 402 g of 3.3.5-trimethyl-5-isocyanatomethyl-cyclohexylisocyanate is worked up with 1260 g of quartz sand by stirring the mixture in a vacuum of 1 Torr at 100°C.

The mixture of polyol and hardener (average functionality 2.94, molar ratio of cycloaliphatic to aliphatic as 1 : 17) is prepared by mixing the following components:

135 g of trimethylolpropane
15 g of perhydrobisphenol
60 g of the polyether from Example 1, Sample A
30 g zeolite paste prepared by mixing zeolite with castor oil in the ratio of 1 : 1 and
240 g of quartz sand in a vacuum (1 Torr) at 100°C until the mixture is free from bubbles. The resin and hardener are mixed together at normal pressure at 100°C within a few minutes.

A drip edge support is cast in a steel mold which has been heated to 120°C. The product is set by heating at 120°C for 16 hours. The support can withstand 24 kV in the open air test without showing traces of tracking. Plates can be cast from the same reaction mixture in aluminum molds. These are set at 120°C for 16 hours. Properties of molded material:

| | | |
|---|---|---|
| Flexural strength | DIN 53 452 | 1400–1600 kp/cm² |
| Tensile strength | DIN 53 455 | 800–970 kp/cm² |
| Compression strength | DIN 53 454 | 2700 kp/cm² |
| Impact strength | DIN 53 453 | 6–8 kp/cm/cm² |
| Marten's degree | DIN 53 462 | 120–146°C |
| Arc resistance | ASTM D 495 | 220 seconds |
| Tracking endurance | ASTM D 2303 | at 6 kV > 480 min |

EXAMPLE 4

The isocyanate resin component consisting of 390 of 4,4'-diisocyanatodicyclohexylmethane and 1170 g of quartz sand is processed by stirring in a vacuum of 1 Torr at 100°C.

The mixture of polyol and hardener is prepared by mixing the following components in a vacuum (1 Torr) at 100°C until free from bubbles:
12.3 g of perhydrobisphenol
112.5 g of trimethylolpropane
50.2 g of the polyether polyol used in Example 1, Sample A,
25.0 g of zeolite paste obtained from 1 part of zeolite and 1 part of castor oil,
300.0 g of quartz sand.

The reaction mixture is obtained within a few minutes by mixing the resin and hardener at normal pressure and 100°C.

A drip edge support is cast in a steel mold at 130°C. It is set at 130°C for 16 hours. The support can be kept at 24 kV in the open air test without showing traces of tracking.

The same reaction mixture can be used for forming plates in aluminum molds. Hardening at 130°C for 16 hours. Properties of molded product:

| | | |
|---|---|---|
| Flexural strength | DIN 53 452 | 1400–1660 kp/cm² |
| Impact strength | DIN 53 453 | 5.5–8.4 kp cm/cm² |
| Martens degree | DIN 53 462 | 124°C |
| Arc resistance | ASTM D 495 | 210 seconds |
| Tracking endurance | ASTM D 2303 | at 6 kV - 480 min |

Examples 2 to 4 show that a sufficiently long processing time can be obtained at elevated temperatures of 90° to 100°C.

The arc resistance values for systems which are free from aromatic groups are above 200 seconds. The test for long term resistance to tracking at high voltage shows no tracking even after 480 minutes in the voltage class of 6 kV. After termination of the test, the samples show signs of slight erosion but no deformation because the plates (50 × 120 × 4 mm) are able to withstand the thermal stresses during the test period because of their high dimensional stability under heat (Martens degree above 120°C).

The drip edge insulators manufactured from the cycloaliphatic systems are completely functional when exposed to a voltage of 24 kV.

Although the invention has been described in detail for the purpose of illustration, it is to be understood that variations can be made therein by those skilled in the art without departing from the spirit and scope of the invention except as it may be limited by the claims.

What is claimed is:

1. A method of manufacturing polyurethane products which are arc resistant, tracking resistant and resistant to open air conditions adapted for use as open air electrical insulators and electric switch plants which comprises reacting:

A. polyisocyanates in which at least some of the isocyanate groups are cycloaliphatically bound, said polyisocyanate consisting of an organic polyisocyanate or an organic polyisocyanate mixture in which at least 25% of the isocyanate groups present are cycloaliphatically bound isocyanate groups and which apart from said cycloaliphatically bound isocyanate groups contain only aliphatically bound isocyanate groups, with B. a polyol mixture, the ratios of the reactants being selected to correspond to an NCO/OH ratio of between 0.8 and 1.2, the said polyol mixture being one having an average hydroxyl functionality of 2.2 to 3.0 and consisting essentially of
   1. 5–30% by weight, based on the total polyol mixture, of a polyol with a molecular weight below 1,000 and which 50% to 100% of the hydroxyl groups are cycloaliphatically bound hydroxyl groups and which a part from said cycloaliphatic bound hydroxyl groups contain only aliphatically bound hydroxyl groups and,
   2. 70–95% by weight of a polyol with a molecular weight below 1,000 which contains only aliphatically bound hydroxyl groups.

2. The method of claim 1 wherein the aliphatic polyol component (2) is a mixture consisting of
   a. 100 parts by weight of alkane polyol, b. 0 – 80 parts by weight of aliphatic polyether polyol and
c. 0 – 25 parts by weight of polyol which contains ester groups.

3. The method of claim 1 wherein the polyisocyanate is 3-isocyanatomethyl-3,5,5-trimethyl-cyclohexyl isocyanate.

4. A method for making a shaped article having improved electrical insulating properties and dimensional stability comprising shaping a mixture of reactive components containing
   a. a polyisocyanate having only cycloaliphatic isocyanato groups,
   b. a polyisocyanate having only cycloaliphatic and aliphatic isocyanato groups, or
   c. a mixture of (a) or (b) with an aliphatic polyisocyanate, with a polyol mixture containing
   d. 5 to 30 percent by weight, based on the total weight of the polyol mixture of a polyol or polyol mixture having a molecular weight below about 1000 in which the hydroxyl groups are only cycloaliphatically or aliphatically bound and at least 50% thereof are cycloaliphatically bound; and
   e. 70 to 90 percent by weight of a polyol or polyol mixture having a molecular weight below 1000 in which the hydroxyl groups are substantially all aliphatically bound.

5. The method of claim 4 wherein the NCO to OH ratio of the mixture is 0.8 to 1.2 and the polyol mixture of (d) and (e) has an average hydroxyl functionality of 2.2 to 3.

6. The product of the method of claim 4.

7. The method of claim 4 wherein the polyol mixture contains up to 10% by weight of a polyol having a molecular weight of above 1000.

* * * * *